(12) United States Patent
Goldner et al.

(10) Patent No.: US 8,153,956 B2
(45) Date of Patent: Apr. 10, 2012

(54) INTERROGATOR FOR A PLURALITY OF SENSOR FIBER OPTIC GRATINGS INCLUDING A MASKING COMPENSATION OPERATION

(75) Inventors: Eric Lee Goldner, Valencia, CA (US); Gerald Robert Baker, West Hills, CA (US)

(73) Assignee: US Seismic Systems, Inc., Chatsworth, CA (US)

( * ) Notice: Subject to any disclaimer, the term of this patent is extended or adjusted under 35 U.S.C. 154(b) by 0 days.

(21) Appl. No.: 13/170,235

(22) Filed: Jun. 28, 2011

(65) Prior Publication Data
US 2011/0255078 A1     Oct. 20, 2011

Related U.S. Application Data

(62) Division of application No. 12/718,234, filed on Mar. 5, 2010, now Pat. No. 7,994,469, which is a division of application No. 12/257,305, filed on Oct. 23, 2008, now Pat. No. 7,683,312.

(60) Provisional application No. 61/000,257, filed on Oct. 23, 2007.

(51) Int. Cl.
*G01J 1/04*     (2006.01)

(52) U.S. Cl. ............................ 250/227.14; 250/237 G
(58) Field of Classification Search ............. 250/227.14–227.23, 237 G, 237 R; 385/11–13, 123–128, 43; 398/201
See application file for complete search history.

(56) References Cited

U.S. PATENT DOCUMENTS

| | | | |
|---|---|---|---|
| 4,155,005 A | 5/1979 | Knowlton et al. | |
| 5,712,932 A | 1/1998 | Alexander et al. | |
| 6,654,521 B2 * | 11/2003 | Sheng et al. | 385/37 |
| 2002/0063866 A1 | 5/2002 | Kersey et al. | |

* cited by examiner

*Primary Examiner* — Que T Le
(74) *Attorney, Agent, or Firm* — Stradley Ronon Stevens & Young, LLP

(57) ABSTRACT

An interrogator for a plurality of sensor fiber optic gratings. The interrogator includes a broadband optical source; at least one beam splitter directing output of the optical source to the sensor fiber optic gratings; at least one linear filter for converting changes in peak reflection wavelength to changes in intensity; at least one optical receiver; and at least one amplifier associated with each optical receiver. The interrogator also includes, alternatively, a driver/modulator for the optical source providing on/off pulses; an analog integrator following the at least one amplifier; or a mechanism compensating for masking of one sensor fiber optic grating by another.

3 Claims, 3 Drawing Sheets

— masked FBG at 1550 nm
-- masked FBG at 1552 nm masking 2nd FPG wavelength (nm)

INTERROGATOR FOR A PLURALITY OF SENSOR FIBER OPTIC GRATINGS INCLUDING A MASKING COMPENSATION OPERATION

CROSS-REFERENCE TO RELATED APPLICATIONS

This application is a divisional of co-pending application Ser. No. 12/718,234, filed on Mar. 5, 2010 and now allowed, which is a divisional of application Ser. No. 12/257,305, filed on Oct. 23, 2008 and issued as U.S. Pat. No. 7,683,312, claiming priority of provisional application No. 61/000,257 filed on Oct. 23, 2007.

FIELD OF THE INVENTION

This invention relates generally to the field of fiber optic sensing systems and, more particularly, to an improved method and apparatus for accurately measuring the center wavelength of the reflection spectrum of a fiber optic grating.

BACKGROUND OF THE INVENTION

Fiber Bragg gratings (FBGs) are commonly used in fiber optic systems for measuring physical quantities such as temperature, pressure, and strain at a plurality of sensors. A number of different approaches have been used for the interrogation of FBGs, that is, for determining the center wavelength of the reflection spectrum of each FBG. The prior approaches have several shortcomings, however, that render their usefulness limited for practical applications. Some of these shortcomings include:
  Limited number of FBGs that can be interrogated along a single optical fiber;
  Instability of optical source output properties;
  Wavelength errors due to stable optical source ripple phase;
  Susceptibility to intensity and spectrum changes in components that can cause wavelength errors;
  Susceptibility to power supply noise;
  Wavelength errors due to low frequency receiver output drift;
  Errors due to multi-FBG source spectrum masking; and
  Wavelength uncertainty due to low signal-to-noise resulting from very short analog-to-digital conversion times.
Therefore, there remains a need to mitigate the above-mentioned problems.

SUMMARY OF THE INVENTION

To meet this and other needs, and in view of its purposes, the present ensures very stable, very repeatable, high-speed FBG interrogation without the need for periodic recalibration. The interrogator comprises a broadband optical source, at least one beam splitter directing output of the optical source to an array of fiber optic gratings, at least one linear transmission or reflection filter, at least one optical receiver, and at least one amplifier associated with each receiver. In one aspect of the invention, a linear transmission filter is used to convert the change in center wavelength of a grating reflectivity spectrum to a change in intensity, which is proportional to the change in the grating central wavelength. In another aspect of the invention, a pair of opposite-sloped linear transmission filters are utilized to normalize the received and filtered reflections with respect to total optical power. In another aspect of the invention, the optical source is pulsed, and return pulses from each fiber optic grating to be measured are sampled by the interrogator at different times. In another aspect of the invention, the source driver randomizes ripple phase versus wavelength to reduce wavelength measurement error. In another aspect of the invention, active closed-loop circuits are added to the receiver amplifiers to stabilize the amplifier output. In yet another aspect of the invention, a temperature-controlled compensating array of fiber optic gratings is interrogated each time the measurement array of gratings is interrogated. In still another aspect of the invention, a fast reset analog integrator is added to the amplifier stage(s) to improve the signal detection threshold. In another aspect of the invention, the wavelength measurement is compensated for the effects of one grating shading another.

It is to be understood that both the foregoing general description and the following detailed description are exemplary, but are not restrictive, of the invention.

BRIEF DESCRIPTION OF THE DRAWINGS

The invention is best understood from the following detailed description when read in connection with the accompanying drawings. It is emphasized that, according to common practice, the various features of the drawings are not to scale. On the contrary, the dimensions of the various features are arbitrarily expanded or reduced for clarity. Included in the drawings are the following figures.

DETAILED DESCRIPTION OF THE INVENTION

In the following description, for purposes of explanation and not limitation, specific details are set forth in order to provide a thorough understanding of the present invention. However, it will be apparent to one skilled in the art that the present invention may be practiced in other embodiments that depart from these specific details. In other instances, detailed descriptions of well-known methods and devices are omitted so as to not obscure the description of the present invention with unnecessary detail.

Figure 1:
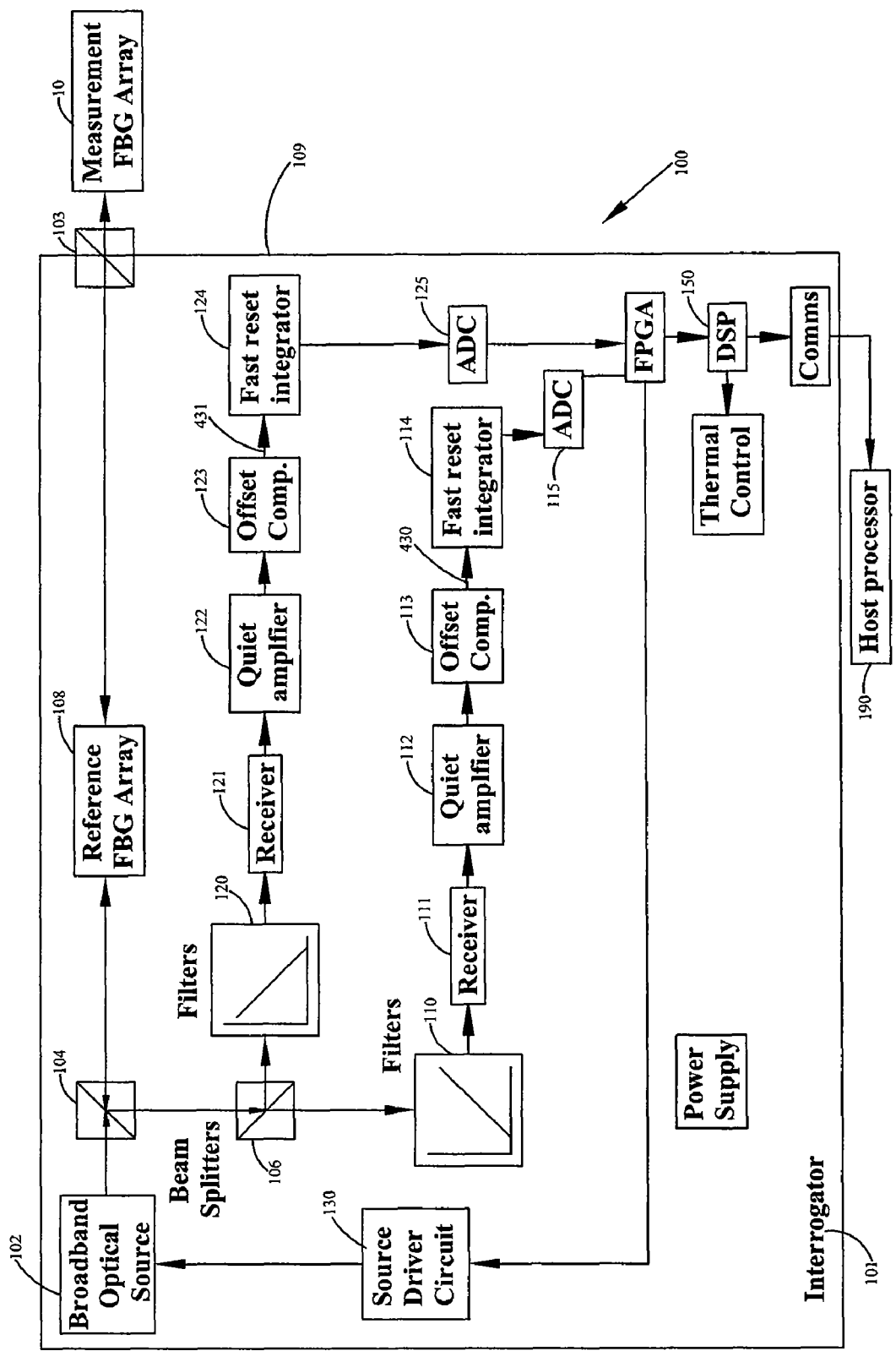
FIG. 1 is a block diagram of an interrogator in accordance with an embodiment of the present invention.

An exemplary sensor interrogation system 100 embodying the present invention is shown in FIG. 1. In many respects, this system follows practices of prior FBG interrogators as shown by earlier patents and in the open literature. Fundamentally, the interrogator illuminates an array of FBGs 10 with a broadband optical source 102 (LED, ELED, SLD, SLED, ASE source, SOA, etc.) through a first optical beam splitter 104 (bulk optic type, or a fiber optic coupler or fiber optic circulator, for example). The reflection spectrum of each FBG is convolved with a particular linear transmissive or reflective filter 110, 120 after passing through a second beam splitter 106. If the transmission spectrum of the filter (transmissive-type, for example) is linear with wavelength, then the roughly Gaussian FBG reflection spectra through the filter 110, 120 will yield an output (after the filter) whose intensity varies approximately linearly with the FBG reflection spectrum center wavelength. This intensity is then measured using an optical receiver 111, 121 (a photodiode such as a PIN or avalanche photodiode, for example) followed by a transimpedance amplifier 112, 122, which may then be followed by additional electrical gain stages. Examples of appropriate linear transmissive filters are pigtailed dielectric filters such as Optical Add/Drop Multiplexers (OADMs) used in fiber optic telecommunications, dielectric filters coated on the end of a fiber or connector at the receiver, dielectric coatings on the receiver window, and shallow-sloped FBGs. The first beam splitter 104 following the optical source may be a fiber optic circulator to minimize insertion loss and to minimize power reflected back into the source.

To accommodate many FBGs in the measurement array, the optical source is operated in a pulsed mode. The return pulses from the FBGs are, therefore, separated in time with a separation defined by their physical separation, and are of a width equal in time to the source pulse width.

Within the interrogator 101 is included an array 108 of at least one, and preferably at least three, compensation FBGs located between the circulator 104 and the bulkhead connector 103 at the chassis 109 of the interrogator 101 that connects to the measurement FBG array 10. These compensation FBGs have center wavelengths that are nominally distributed roughly equally throughout the wavelength measurement range of the system.

Use of two opposite slope filters 110, 120 enables continual normalization of the data with respect to total power received. This is less important for dynamic measurements, but useful for accurate scaling of data (counts output from the A-to-D Converters (ADCs) 115, 125 per pm of wavelength shift).

The compensation array 108, slope filters 110, 120, and second beam splitter 106, which may be preferably a fiber optic coupler such as a fused biconical taper coupler, are held at a constant temperature by a resistance heater within a large thermal mass, such as a thick machined aluminum housing. The temperature of the thermal mass, also known as an optical cassette, is carefully monitored to a precision of +/−0.1 degrees C. The temperature dependence of the reflection spectrum of the compensation FBGs is well known and stored as compensation data within the interrogator. The importance of controlling the temperature of the optical elements within the optical cassette is to minimize thermally induced changes in optical spectra that otherwise would cause errors in the measured FBG wavelengths. Since the center wavelengths of the compensation FBG reflection spectra are well known and stored, these are used to correct for changes in source intensity or spectrum (for example, due to aging) or changes in the beam splitter or coupler transmission spectra, and can be used to correct every time the measurement FBG array is sampled, which can be up to millions of times per second.

The source intensity ripple preferably has an amplitude no larger than 0.2 dB relative to the peak intensity. The ripple should have a period of less than 0.3 nm. The compensation and measurement FBGs should have a peak wavelength of about 4% if 10 or fewer measurement FBGs are used. The FBGs should have a peak wavelength of 0.1 to 0.2% if there are between 10 and 200 measurement FBGs. The full width at half maximum reflection spectrum (FWHM) should be about 1.25 nm.

A. Source Ripple Phase Randomization

It can be shown that source ripple (sinusoidal intensity versus wavelength) which is fixed in phase (relative to wavelength) can cause significant error in the determination of the center reflection wavelength of FBGs using a filter technique such as utilized herein. It can also be shown that a slight randomization of this ripple phase versus wavelength, which is slow compared to the detection bandwidth (in time), can dramatically reduce this error as long as the detected optical intensity (after the filter) is integrated with an integration time significantly longer than the periodicity, in time, of this randomization. To accomplish this, the injection current provided by the source driver circuit 130 to the optical source 102 is varied sinusoidally, with peak-to-peak variation of about 1% and a period of about 0.1 to 1% of the sampling interval. For example, if a 1 MHz sample rate is used, this source driver would have a period of 10-100 kHz and an integration time of at least 1 mSec, yielding a practical system bandwidth of close to 1 kHz.

Figure 2:
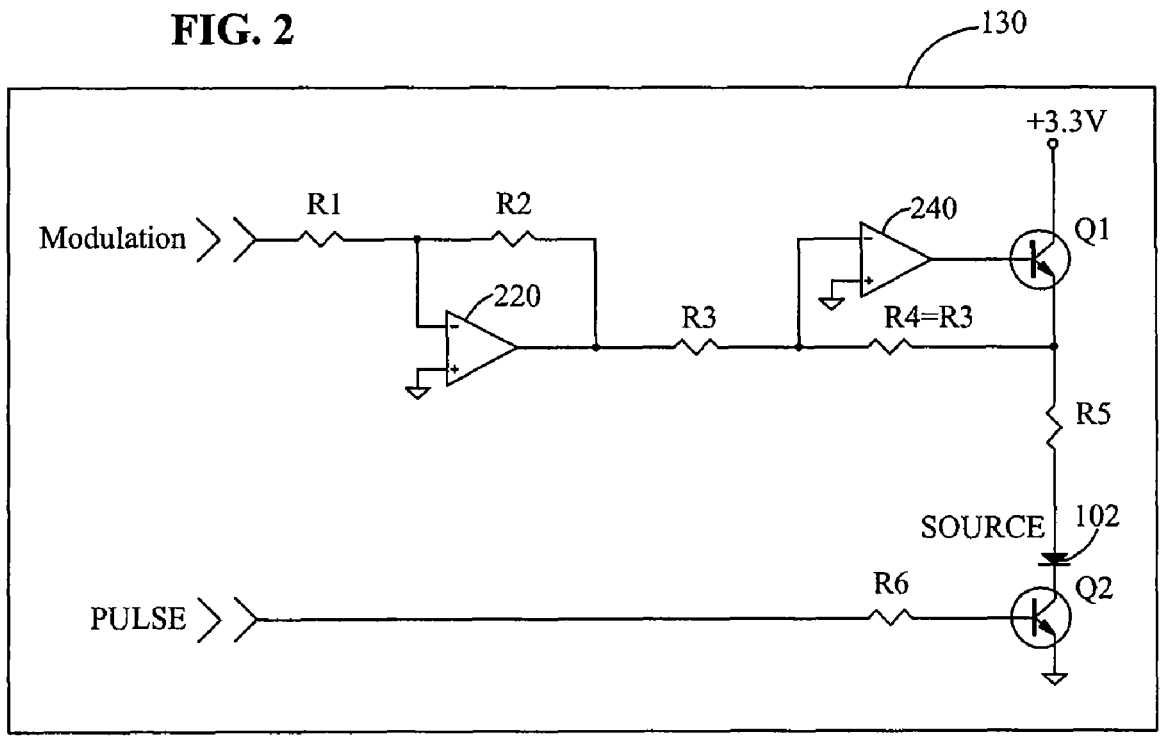
FIG. 2 is a circuit diagram for a source driver.

A source driver circuit 130 is shown in FIG. 2. In this figure, on/off intensity (pulsing) modulation (for time-division multiplexing of the measurement FBGs and small amplitude modulation for the source ripple phase modulation) are input to the left of resistor R1. Amplifier 220 inverts this signal with a gain of value R2/R1 where R2 is a feedback resistor. Amplifier 240 inverts the resultant signal again, with unity gain.

B. Receiver Offset Stabilization

The amplified receiver output and hence the calculated FBG wavelengths are highly sensitive to very low frequency (especially slower than the system bandwidth) changes in the receiver output. To mitigate this problem, an active closed loop circuit 113, 123 is added, either between amplifiers (if multiple gain stages are utilized) or, as shown in FIG. 1, following the amplifiers 112, 122. This circuit adds a bucking voltage to stabilize the amplified output. Without this sort of compensation, the system dynamic range is otherwise reduced, possibly very significantly. However, this closed loop stabilization is not a complete solution. This is because the system has no way of distinguishing electrical offset from "real" slow wavelength changes.

Figure 3:
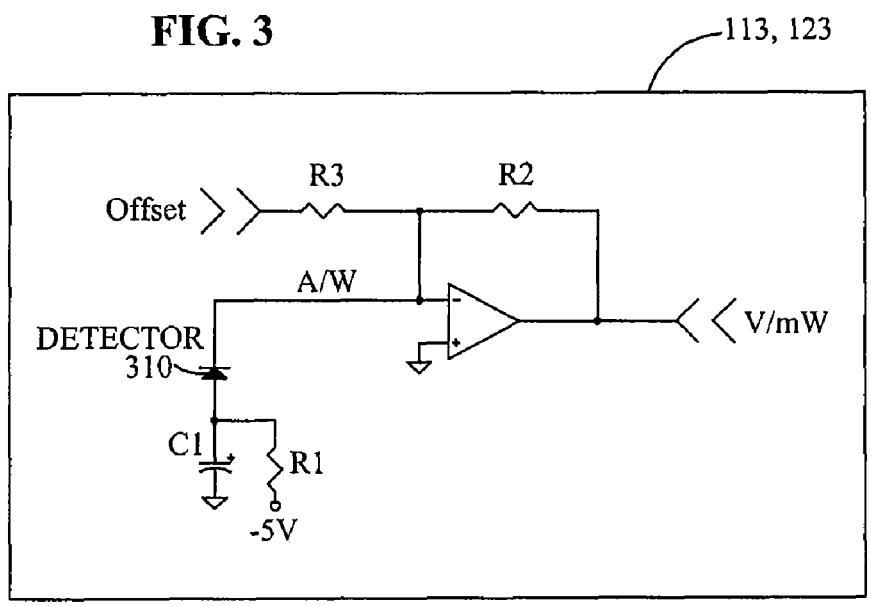
FIG. 3 is a circuit diagram for a receiver offset stabilization circuit.

To overcome this second order electrical offset problem, the compensating FBG array 108 is employed. The temperature of the compensating FBGs is carefully controlled to approximately 0.1° C. and measured to within an accuracy of about 0.05° C. The interrogator 101 is carefully calibrated over the operational temperature range to which the compensation FBG array 108 is anticipated to be exposed. Since each of the FBGs of measurement FBG array 10 is sampled within less than about 50 microseconds of when the compensation FBGs are sampled, the receiver output offset is expected not to change to any considerable amount during this time, and it is the low frequency offset variation that this compensation approach is used to mitigate. The stabilization circuitry is shown in FIG. 3. Note that although only one receiver offset compensation circuit is shown, the system can utilize one per receiver channel as shown by 113 and 123 in FIG. 1.

In FIG. 3, the detector 310 is biased via resistor R1 to −5V and filtered via capacitor C1. It should be noted that capacitor C1 may comprise multiple capacitors to provide both high and low frequency filtering, if needed. The output of the detector 310 consists of a photocurrent proportional to the input optical intensity received. Amplifier U1/resistor R2 makes up the trans-impedance amplifier, where resistor R2 typically has a value on the order of 10 kΩ. The DC offset compensation consists of a signal (offset) from the postprocessor (DSP 150) that indicates the amount of offset voltage needed to correct the DC offset as detected in a dead/unused time slot or slots of the time division multiplexed (TDM) input signal. The offset gain and period are determined by the post processing (DSP 150) firmware/software.

In an alternate embodiment, an extra fiber segment is added between the reference FBG array 108 and the measurement FBG array 10. Sampling of a point in time between the reference FBG and the measurement FBG array yields no returned light intensity. However, sampling during this time enables a measurement of the DC offset existing within the analog front end (receivers 111, 121, amplifiers 112, 122, offset compensation circuits 113, 123, and fast reset integrators 114, 124) of the interrogator 101. This provides a reference against which the software can correct all other measurements of the reflected light pulses (from the various FBGs) to minimize the effects of DC offsets in the analog front end circuitry (receivers 111, 121, amplifiers 112, 122, offset compensation circuits 113, 123, and fast reset integrators 114, 124). This can be very important for ensuring very high long-term stability of the system 100. This correction can also be applied every time the optical returns from the measurement FBG array 10 are sampled.

C. Analog Integrator

One problem associated with high-speed acquisition of the received optical signals is the very fast sample time required. This results in a much smaller number of photo-electrons captured than is possible, or optimal for high accuracy performance of the system 100. In other words, for example, if the ADC is strobed for conversion every 40 nSec (to allow for ~4 m fiber separation between FBGs), and the typical sample time might be on the order of 4 nSec, then roughly 90% of the available and useful photocurrent (information) is discarded without use.

To mitigate this problem, the present invention incorporates an analog fast reset electrical integrator 114, 124 either between the amplifiers (if multiple gain stages are utilized) or following the amplifiers and offset compensation circuits 113, 123. This additional circuit increases the amplitude of the (noise-free) voltage available for conversion at the ADCs 115, 125. This results in an improved minimum detectable signal, without reducing the system dynamic range. The result is improved wavelength measurement precision of the system 100.

Because of various timing uncertainties in the system 100 (fixed fiber lead length differences between FBGs, thermal variations, jitter, etc.), as well as changes in the fixed DC offset (zero light level voltage), it is critical that not only is the strobe timing for the ADC carefully controlled, but that the integrator have a very fast reset. This ensures that no residual low frequency drift is added to the voltage. This reset will need to be on the order of one percent of the acquisition (conversion) interval. This enables the reset integrated voltage to be fully stabilized before the output of the integrator 115, 125 is affected by the next pulse.

Figure 4:
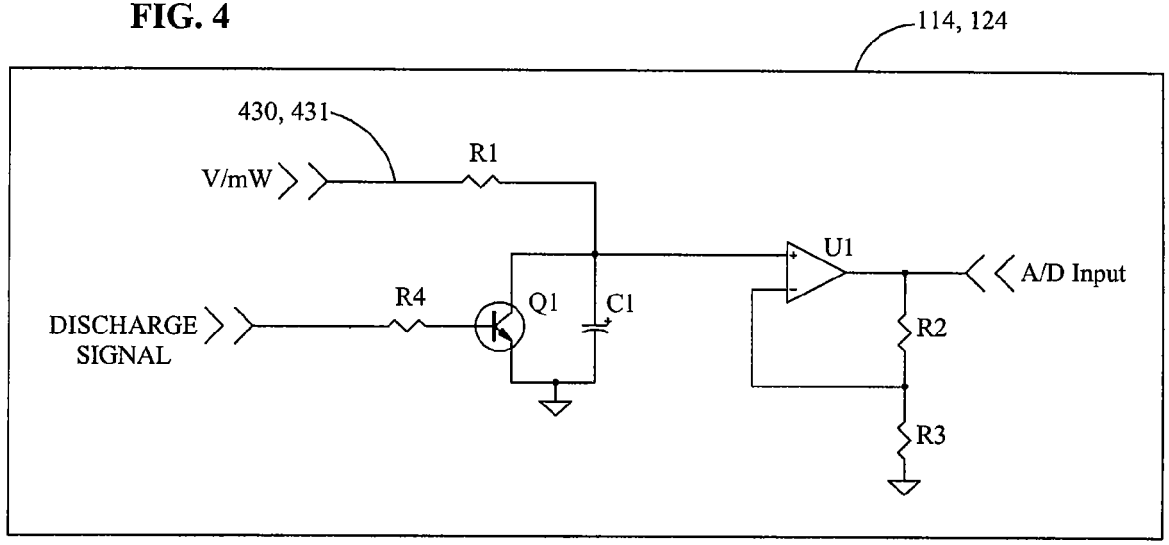
FIG. 4 is a circuit diagram for a fast reset integrator.

FIG. 4 is an example of the implementation of a fast reset integrator 114, 124. In the figure, resistor R1/capacitor C1 provide the filter/integration for the input V/mW 430, 431 from the previous circuitry in the receiver line. Resistor R4/transistor Q1 provide a fast discharge path for capacitor C1, and transistor Q1 is released for integration at the beginning of each TDM cycle (one for each FBG). The voltage across capacitor C1 is amplified by amplifier U1/resistor R2/resistor R3, which provides a low impedance driver for the input to the A/D converter 115, 125.

D. Masking Compensation

Figure 5:
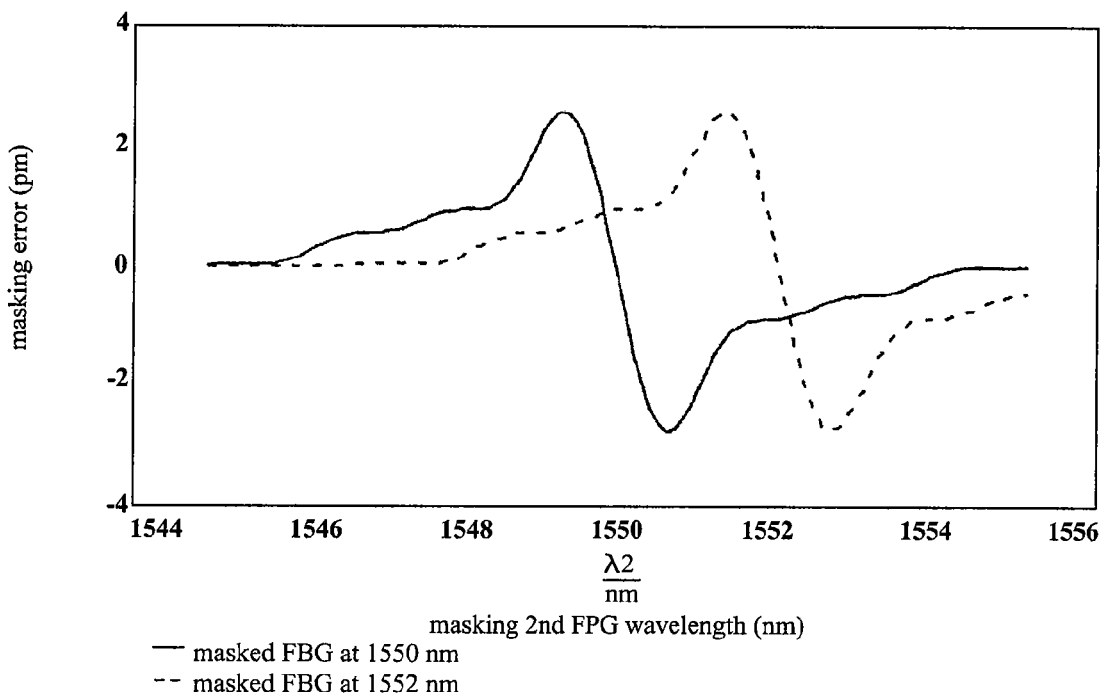
FIG. 5 illustrates the masking error resulting from shadowing of successive FBGs.

One problem with TDM FBG interrogation is the potential for shading, which has not to date been discussed in the open literature, nor has a solution been disclosed in prior patents. The problem is that even though each FBG is observed via the filters 110, 120 and receivers 111, 121 at a different segment in time, the source spectrum is altered, or masked, by each preceding FBG, which acts as a double-pass transmission filter whose transmission is approximately one minus its reflection at each wavelength. For a typical SLED or SOA source and roughly Gaussian FBG reflection spectrum, the typical error associated with the measurement of a shaded FBG is shown in FIG. 5. In this example, the FWHM of both of the FBGs is 1.25 nm, and the peak reflectivity is 1.0%. As can be seen in the graph, as the center wavelength of the masking FBG (the one closest to the optical source) is changed from 1,545 nm to 1,555 nm, the measurement error of the second (masked) FBG's reflection spectrum center wavelength varies from +2.5 to −2.5 pm. The worst case error occurs when the center wavelength of the masking FBG is at ±0.5*FWHM of the FBGs. Wavelength correction of the masked FBG is achieved by utilizing the following method:

Calibrate the error function shown in FIG. 5 by the use of two FBGs whose individual wavelengths are well known while one shadows the other;

Measure the center wavelength of the first (unmasked) FBG;

Determine the "raw" (uncompensated) value of the second (masked) FBG;

Correct the masked FBG wavelength by utilizing a lookup table populated with values of the calibrated error function shown in FIG. 5, and subtracting the indicated error value from the "raw" value; and For an array of multiple FBGs, this process is repeated for each successive FBG in the array, starting from the optical source.

This method is executed within the DSP 150 since it can be done at a relatively slow rate. The correction tables are stored within the memory of the DSP 150, and the code can be within the system firmware. Alternatively, the code and correction tables can be stored with the software/RAM/ROM of a host processor 190.

It will be recognized that the above-described invention may be embodied in other specific forms without departing from the spirit or essential characteristics of the disclosure. Thus, it is understood that the invention is not to be limited by the foregoing illustrative details, but rather is to be defined by the appended claims.

What is claimed is:

1. An interrogator for a plurality of sensor fiber optic gratings comprising:
    a broadband optical source;
    at least one beam splitter directing output of the optical source to the sensor fiber optic gratings;
    at least one linear filter for converting changes in peak reflection wavelength to changes in intensity;
    at least one optical receiver;
    at least one amplifier associated with each optical receiver; and
    means for compensating for masking of one sensor fiber optic grating by another.

2. The interrogator of claim 1 wherein the means for compensating implements a method comprising the steps of:
    calibrating an error function using a pair of known fiber optic gratings arranged such that one masks the other;
    measuring a center wavelength of the unmasked fiber optic grating;
    determining an uncompensated wavelength of the unmasked fiber optic grating; and
    correcting the uncompensated wavelength with a correction factor determined from the error function using the measured center wavelength of the unmasked fiber optic grating.

3. The interrogator of claim 1 wherein the broadband optical source is one of a Light Emitting Diode (LED), a Superluminescent Light Emitting Diode (SLED), an Amplified Spontaneous Emission (ASE) source, and a Semiconductor Optical Amplifier (SOA).

* * * * *